United States Patent
Ishibashi et al.

(10) Patent No.: US 8,160,799 B2
(45) Date of Patent: Apr. 17, 2012

(54) TURBINE BYPASS CONTROL APPARATUS AND TURBINE BYPASS CONTROL METHOD

(75) Inventors: Naohiko Ishibashi, Hiroshima-ken (JP); Takehiro Ishigaki, Hiroshima-ken (JP); Toshikazu Kondo, Hiroshima-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 606 days.

(21) Appl. No.: 12/365,469

(22) Filed: Feb. 4, 2009

(65) Prior Publication Data
US 2009/0204305 A1  Aug. 13, 2009

(30) Foreign Application Priority Data
Feb. 5, 2008  (JP) ................... 2008-025660

(51) Int. Cl.
*F01K 13/02* (2006.01)
*F01K 7/16* (2006.01)
(52) U.S. Cl. .................... 701/100; 415/144
(58) Field of Classification Search .......... 701/100
See application file for complete search history.

(56) References Cited

U.S. PATENT DOCUMENTS

| | | | | |
|---|---|---|---|---|
| 2,612,944 A * | 10/1952 | Orr, Jr. | ...... | 60/243 |
| 2,637,374 A * | 5/1953 | Campbell | ...... | 60/243 |
| 2,747,373 A * | 5/1956 | Eggenberger et al. | ...... | 60/656 |
| 2,979,306 A * | 4/1961 | Maye | ...... | 415/145 |
| 3,150,487 A * | 9/1964 | Mangan et al. | ...... | 60/39.182 |
| 3,362,337 A * | 1/1968 | Gilman | ...... | 137/202 |
| 3,934,419 A * | 1/1976 | Aanstad | ...... | 60/660 |
| 4,577,280 A * | 3/1986 | Putman | ...... | 700/282 |
| 4,604,714 A * | 8/1986 | Putman et al. | ...... | 700/288 |
| 4,628,462 A * | 12/1986 | Putman | ...... | 700/288 |
| 2009/0204305 A1* | 8/2009 | Ishibashi et al. | ...... | 701/100 |
| 2009/0288414 A1* | 11/2009 | Takeshita et al. | ...... | 60/645 |

FOREIGN PATENT DOCUMENTS
JP  34-1801  4/1959
(Continued)

OTHER PUBLICATIONS

Notice of Acceptance date Jan. 28, 2011, issue in corresponding Australian Patent Application No. 2009200389.

(Continued)

*Primary Examiner* — Shelley Chen
(74) *Attorney, Agent, or Firm* — Westerman, Hattori, Daniels & Adrian, LLP

(57) ABSTRACT

A turbine bypass control method includes: a high-pressure side pressure controller configured to output a first operation amount signal corresponding to a valve opening; a low-pressure side pressure controller configured to output a second operation amount signal corresponding to a valve opening; a high value selector configured to output as a high value operation amount signal, one of the first operation amount signal and the second operation amount signal which indicates a larger opening; a first signal switching unit configured to receive the high value operation amount signal and the second operation amount signal and output a first bypass valve operation amount signal; a second signal switching unit configured to receive the high value operation amount signal and the first operation amount signal and output a second bypass valve operation amount signal; and a rapid opening controller. Before start of trip of a turbine, the turbine is driven by steam which flows from the high-pressure side header to the low-pressure side header through the turbine.

16 Claims, 6 Drawing Sheets

FOREIGN PATENT DOCUMENTS

| | | |
|---|---|---|
| JP | 56-159601 U | 11/1981 |
| JP | 58-200010 A | 11/1983 |
| JP | 64-087807 A | 3/1989 |
| JP | 6-123203 A | 5/1994 |
| JP | 6-330706 A | 11/1994 |
| JP | 7-133703 A | 5/1995 |
| JP | 7-229405 A | 8/1995 |
| JP | 7-305605 A | 11/1995 |
| JP | 11-257018 A | 9/1999 |

OTHER PUBLICATIONS

Japanese Office Action dated Oct. 18, 2011, issued in corresponding Japanese Patent Application No. 2008-025660.

* cited by examiner

TURBINE BYPASS CONTROL APPARATUS AND TURBINE BYPASS CONTROL METHOD

INCORPORATION BY REFERENCE

This patent application claims priority on convention based on Japanese Patent Application No. 2008-025660. The disclosure thereof is incorporated herein by reference.

BACKGROUND OF THE INVENTION

1. Field of the Invention

The present invention relates to a turbine bypass control, and particularly relates to a turbine bypass control suitable on a turbine trip.

2. Description of Related Art

A steam pressure control on a turbine trip is conventionally carried out.

Japanese Patent Application Publication (JP-A-Heisei 7-229405) discloses a turbine bypass control method for a combined plant. The combined plant includes a turbine bypass and a turbine governor. The turbine bypass is connected to a steam turbine inlet and includes a turbine bypass valve. The turbine governor controls the turbine bypass valve. In the turbine bypass control method, when the turbine governor stops an automatic control to the turbine bypass valve, the turbine governor controls the turbine bypass valve with respect to a set pressure which is a pressure higher by a predetermined value than a turbine inlet steam pressure.

Japanese Patent Application Publication (JP-A-Heisei 11-257018) discloses a steam turbine steam bypass apparatus. The steam turbine steam bypass apparatus includes a turbine bypass valve, a sensor, a flow amount valve opening converting section and a bypass valve control section. The turbine bypass valve drains out steam from a high-pressure steam accumulator and regulates a pressure of the high-pressure steam accumulator. The sensor measures a flow of the steam drained from the high-pressure steam accumulator into the steam turbine. The flow valve opening converting section calculates an increase amount of openings of the turbine bypass valve corresponding to the measured flow amount of the steam. The bypass valve control section controls the turbine bypass valve based on a sum of the valve openings which is obtained based on the pressure in the high-pressure steam accumulator, and the calculated increase amount.

SUMMARY

It is an object of the present invention to provide a turbine bypass control apparatus and a turbine bypass control method for controlling pressures of both of a high-pressure side header and a low-pressure side header connected to a turbine.

In an aspect of the present invention, a turbine bypass control apparatus includes: a high-pressure side pressure controller configured to output a first operation amount signal corresponding to a valve opening; a low-pressure side pressure controller configured to output a second operation amount signal corresponding to a valve opening; a high value selector configured to output as a high value operation amount signal, one of the first operation amount signal and the second operation amount signal which indicates a larger opening; a first signal switching unit configured to receive the high value operation amount signal and the second operation amount signal and output a first bypass valve operation amount signal; a second signal switching unit configured to receive the high value operation amount signal and the first operation amount signal and output a second bypass valve operation amount signal; and a rapid opening controller. Before start of trip of a turbine, the turbine is driven by steam which flows from the high-pressure side header to the low-pressure side header through the turbine, the high-pressure side pressure controller outputs the first operation amount signal based on a signal indicating a high-pressure side pressure in the high-pressure side header and a high-pressure side setting pressure signal, the low-pressure side pressure controller outputs the second operation amount signal based on a signal indicating a low-pressure side pressure in the low-pressure side header and a low-pressure side setting pressure signal, the first signal switching unit outputs the high value operation amount signal as the first bypass valve operation amount signal, the second signal switching unit outputs the high value operation amount signal as the second bypass valve operation amount signal, a first bypass valve is provided for a turbine bypass line connecting the high-pressure side header and the low-pressure side header and is controlled based on the first bypass valve operation amount signal, and a second bypass valve is provided for the turbine bypass line in parallel to the first bypass valve and is controlled based on the second bypass valve operation amount signal. During a first time period from the start of the trip, the rapid opening controller performs rapid opening of at least one of the first bypass valve and the second bypass valve, the high-pressure side pressure controller tracks the first operation amount signal based on an opening of the second bypass valve, and the low-pressure side pressure controller tracks the second operation amount signal based on an opening of the first bypass valve. After a first time period from the start of the trip, the high-pressure side pressure controller outputs the first operation amount signal based on the high-pressure side pressure signal and the high-pressure side setting pressure signal, the low-pressure side pressure controller outputs the second operation amount signal based on the low-pressure side pressure signal and the low-pressure side setting pressure signal, the first signal switching unit outputs the second operation amount signal as the first bypass valve operation amount signal, the second signal switching unit outputs the first operation amount signal as the second bypass valve operation amount signal, the first bypass valve is controlled based on the first bypass valve operation amount signal, and the second bypass valve is controlled based on the second bypass valve operation amount signal.

In another aspect of the present invention, a turbine bypass control method is achieved: by performing a first control to a first bypass valve and a second bypass valve disposed in a turbine bypass line for a turbine; by performing a rapid opening of at least one of the first bypass valve and the second bypass valve during a first time period from start of a trip of the turbine; and by performing a second control to the first bypass valve and the second bypass valve after the first time period from the start of the trip. The turbine is driven by steam which flows from a high-pressure side header to a low-pressure side header through the turbine, the turbine bypass line connects the high-pressure side header and the low-pressure side header, the first bypass valve is provided in parallel to the second bypass valve, the high-pressure side pressure controller outputs a first operation amount signal corresponding to a valve opening, and the low-pressure side pressure controller outputs a second operation amount signal corresponding to a valve opening. In the performing a first control and the performing of a second control, the high-pressure side pressure controller outputs the first operation amount signal based on a signal indicating a high-pressure side pressure in the high-pressure side header and a high-pressure side setting pressure signal, and the low-pressure side pressure controller outputs a second operation amount signal based on a signal indicating a low-pressure side pressure in the low-pressure side header and a low-pressure side setting pressure signal. The performing a first control is achieved: by controlling the first bypass valve and the second bypass valve based on one of the first operation amount signal and the second operation amount signal which indicates a large opening. The performing a rapid opening is achieved: by the high-pressure side pressure controller tracking the first operation amount signal based on an opening of the second bypass valve; and by the low-pressure side pressure controller tracking the second operation amount signal based on an opening of the first bypass valve. The performing a second control is achieved: by controlling the second bypass valve based on the first operation amount signal and controlling the first bypass valve based on the second operation amount signal.

According to the present invention, a turbine bypass control apparatus and a turbine bypass control method for controlling pressures of both a high-pressure side header and a low-pressure side header connected to a turbine are provided.

DESCRIPTION OF THE PREFERRED EMBODIMENTS

Hereinafter, a turbine bypass control apparatus of the present invention will be described in detail with reference to the attached drawings.

[First Embodiment]

Figure 1:
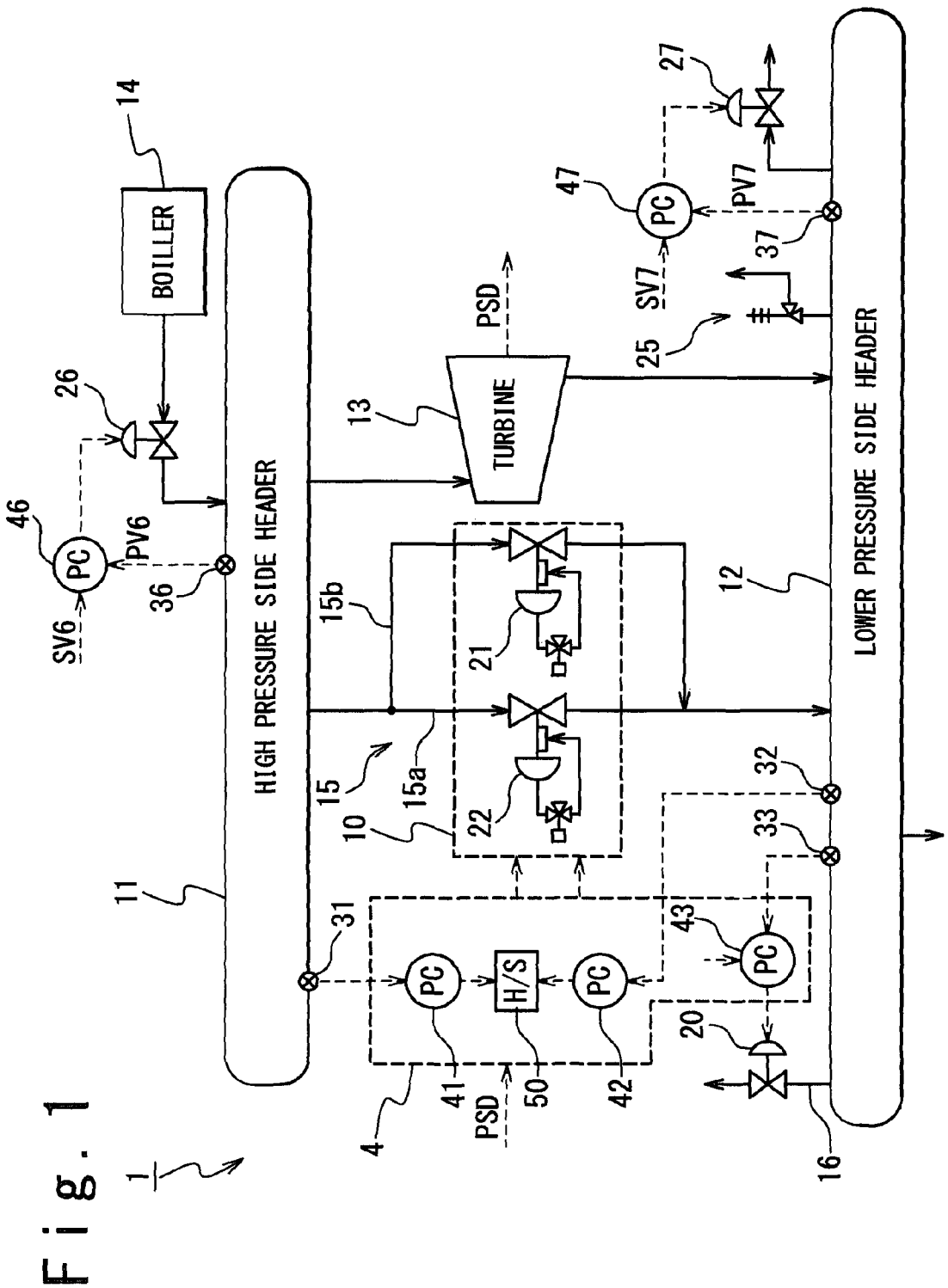
FIG. 1 is a schematic diagram of a steam system according to a first embodiment of the present invention.

FIG. 1 shows a steam system 1 according to a first embodiment of the present invention. The steam system 1 is disposed in a chemical plant or a power plant. The steam system 1 includes a high-pressure side header 11, a low-pressure side header 12, a turbine 13, a boiler 14, a turbine bypass line 15, a blow-off line 16, a control unit 4, a safety valve 25, a high-pressure side inflow control valve 26, a low-pressure side outflow control valve 27, pressure sensors 31 to 33, 36 and 37 and pressure controllers 46 and 47.

The turbine 13 is connected to such a load as a generator or a compressor. The turbine 13 is driven by steam flowing from the high-pressure side header 11 to the low-pressure side header 12 through the turbine 13. The steam system 1 often includes another turbine driven by the steam from the high-pressure side header 11 in addition to the turbine 13. The turbine 13 outputs a trip signal PSD indicating a trip of the turbine 13 to the control unit 4.

The safety valve 25 operates if a steam pressure in the low-pressure side header 12 reaches an operation pressure P5 and releases the steam from the low-pressure side header 12. The operation pressure P5 is 31.5 kg/cm$^2$ G. Hereinafter, "kg/cm$^2$ G" will be expressed as "K/G".

The high-pressure side inflow control valve 26 controls a flow amount of steam flowing from the boiler 14 to the high-pressure side header 11. The pressure sensor 36 detects a steam pressure in the high-pressure side header 11 and outputs a pressure detection signal PV6 indicating the steam pressure. The pressure controller 46 controls an opening of the high-pressure side inflow control valve 26 based on a pressure setting signal SV6 indicating a set pressure P6 and the pressure detection signal PV6, to perform a proportional—integral control (hereinafter, "PI control") with respect to the steam pressure in the high-pressure side header 11. The set pressure P6 is 105 K/G.

The low-pressure side outflow control valve 27 controls a flow amount of steam flowing out from the low-pressure side header 12. The pressure sensor 37 detects the steam pressure in the low-pressure side header 12 and outputs a pressure detection signal PV7 indicating the steam pressure. The pressure controller 47 controls an opening of the low-pressure side outflow control valve 27 based on a pressure setting signal SV7 indicating a set pressure P7 and the pressure detection signal PV7, to perform a PI control with respect to the steam pressure in the low-pressure side header 12. The set pressure P7 is 26.5 K/G.

The turbine bypass line 15 connects the high-pressure side header 11 to the low-pressure side header 12 to hold a parallel relationship between the turbine bypass line 15 and the turbine 13. A turbine bypass valve 10 is provided on the turbine bypass line 15. The turbine bypass valve 10 controls a flow amount of steam flowing from the high-pressure side header 11 to the low-pressure side header 12 through the turbine bypass line 15. The turbine bypass line 15 includes a first line 15a and a second line 15b having a parallel relationship therebetween. The turbine bypass valve 10 includes a second turbine bypass valve 22 provided on the first line 15a and a first turbine bypass valve 21 provided on the second line 15b. The first turbine bypass valve 21 and the second turbine bypass valve 22 hold a parallel relationship therebetween. The first turbine bypass valve 21 controls a flow amount of steam flowing in the second line 15b whereas the second turbine bypass valve 22 controls a flow amount of steam flowing in the first line 15a. The first turbine bypass valve 21 and the second turbine bypass valve 22 hold a parent valve-to-child valve relationship therebetween. The first turbine bypass valve 21 serves as a child valve whereas the second turbine bypass valve 22 serves as a parent valve. If both of the first turbine bypass valve 21 and the second turbine bypass valve 22 are fully opened, the flow amount of the steam flowing in the first line 15a is more than that of the steam flowing in the second line 15b. Each of the first turbine bypass valve 21 and the second turbine bypass valve 22 includes a quick-opening solenoid.

The blow-off line 16 is connected to the low-pressure side header 12. A blow-off valve 20 is provided on the blow-off line 16. The blow-off valve 20 controls a flow amount of steam flowing out from the low-pressure side header 12 through the blow-off line 16.

The pressure sensor 31 detects the steam pressure in the high-pressure side header 11. The pressure sensors 32 and 33 detect the steam pressure in the low-pressure side header 12.

The control unit 4 includes a pressure controller 41, a pressure controller 42 and a high value selector 50, components of which are used to control an opening of the turbine bypass valve 10 (that is, openings of the first turbine bypass valve 21 and the second turbine bypass valve 22). The control unit 4 also includes a pressure controller 43 used to control an opening of the blow-off valve 20.

Figure 2:
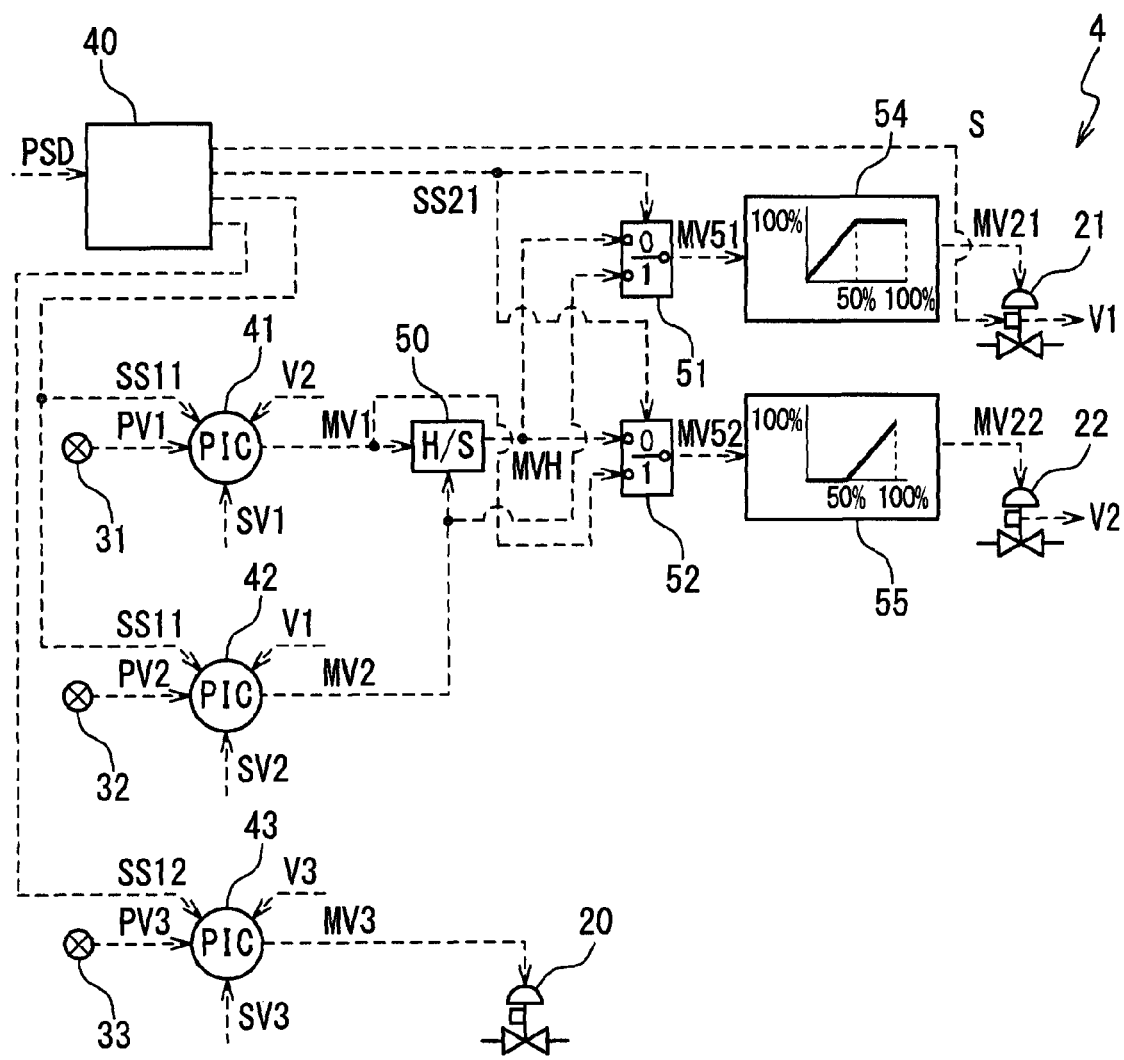
FIG. 2 is a block diagram of a turbine bypass control apparatus according to the first embodiment.

Referring to FIG. 2, the control unit 4 includes a signal output unit 40, signal switching units 51 and 52 and function generators 54 and 55. The first turbine bypass valve 21 outputs a valve opening signal V1 indicating the opening of the first turbine bypass valve 21 to the pressure controller 41. The second turbine bypass valve 22 outputs a valve opening signal V2 indicating the opening of the second turbine bypass valve 22 to the pressure controller 41. The pressure sensor 31 outputs a pressure detection signal PV1 indicating a steam pressure in the high-pressure side header 12 to the pressure controller 41. The pressure sensor 32 outputs a pressure detection signal PV2 indicating the steam pressure in the low-pressure side header 12 to the pressure controller 42. The pressure sensor 33 outputs a pressure detection signal PV3 indicating the steam pressure in the low-pressure side header 12 to the pressure controller 43. The signal output unit 40 outputs a solenoid signal S to the first turbine bypass valve 21, an automatic-manual switching signal SS11 to each of the pressure controllers 41 and 42, an automatic-manual switching signal SS12 to the pressure controller 43 and a pressure control switching signal SS21 to each of the signal switching units 51 and 52 based on the trip signal PSD.

The pressure controller 41 receives the automatic-manual switching signal SS11, the pressure detection signal PV1, a pressure setting signal SV1 indicating a set pressure P1 and the valve opening signal V2. The pressure controller 41 outputs an operation amount signal MV1 corresponding to the valve opening to each of the high value selector 50 and the signal switching unit 52. The set pressure P1 is 110 K/G. The pressure controller 42 receives the automatic-manual switching signal SS11, the pressure detection signal PV2, a pressure setting signal SV2 indicating a set pressure P2 and the valve opening signal V1. The pressure controller 42 outputs an operation amount signal MV2 corresponding to the valve opening to each of the high value selector 50 and the signal switching unit 51. The set pressure P2 is 26 K/G. The high value selector 50 outputs as an operation amount signal MVH, a signal indicating a higher opening of the operation amount signals MV1 and MV2 to each of the signal switching units 51 and 52. The signal switching unit 51 switches between the operation amount signals MVH and MV2 to output one of them as an operation amount signal MV51 to the function generator 54 based on the pressure control switching signal SS21. The signal switching unit 52 switches between the operation amount signals MVH and MV1 to output one of them as an operation amount signal MV52 to the function generator 55 based on the pressure control switching signal SS21. The function generator 54 generates an operation amount signal MV21 indicating the opening of the first turbine bypass valve 21 from the operation amount signal MV51 based on a predetermined first rule and outputs the operation amount signal MV21 to the first turbine bypass valve 21. The function generator 55 generates an operation amount signal MV22 indicating the opening of the second turbine bypass valve 22 from the operation amount signal MV52 based on a predetermined second rule and outputs the operation amount signal MV22 to the second turbine bypass valve 22.

According to the predetermined first rule, when the opening indicated by the operation amount signal MV51 is 0% to 50%, the opening indicated by the operation amount signal MV21 becomes higher as the opening indicated by the operation amount signal MV51 becomes higher. When the opening indicated by the operation amount signal MV51 is 0%, the opening indicated by the operation amount signal MV21 is 0%. When the opening indicated by the operation amount signal MV51 is 50%, the opening indicated by the operation amount signal MV21 is 100%. Furthermore, when the opening indicated by the operation amount signal MV51 is 50% to 100%, the opening indicated by the operation amount signal MV21 is 100%.

According to the predetermined second rule, when the opening indicated by the operation amount signal MV52 is 0% to 50%, the opening indicated by the operation amount signal MV22 is 0%. Furthermore, when the opening indicated by the operation amount signal MV52 is 50% to 100%, the opening indicated by the operation amount signal MV22 becomes higher as the opening indicated by the operation amount signal MV52 becomes higher. When the opening indicated by the operation amount signal MV52 is 50%, the opening indicated by the operation amount signal MV22 is 0%. When the opening indicated by the operation amount signal MV52 is 100%, the opening indicated by the operation amount signal MV22 is 100%.

If a solenoid signal S indicates quick opening, the first turbine bypass valve 21 quickly opens. If the solenoid signal S does not indicate quick opening, the opening of the first turbine bypass valve 21 is controlled based on the operation amount signal MV21. The opening of the second turbine bypass valve 22 is controlled based on the operation amount signal MV22.

The signal output unit 40 also serves as a quick opening controller since the signal output unit 40 opens quickly the first turbine bypass valve 21.

The pressure controller 43 receives an automatic-manual switching signal SS12, the pressure detection signal PV3, a pressure setting signal SV3 indicating a set pressure P3 and a valve opening signal V3 indicating a fixed value of the opening. The pressure controller 43 outputs an operation amount signal MV3 corresponding to the opening of the blow-off valve 20 to the blow-off valve 20. The set pressure P3 is 27 K/G. A fixed value indicated by the valve opening signal V3 is higher than 0% and lower than 100%.

Figure 3:
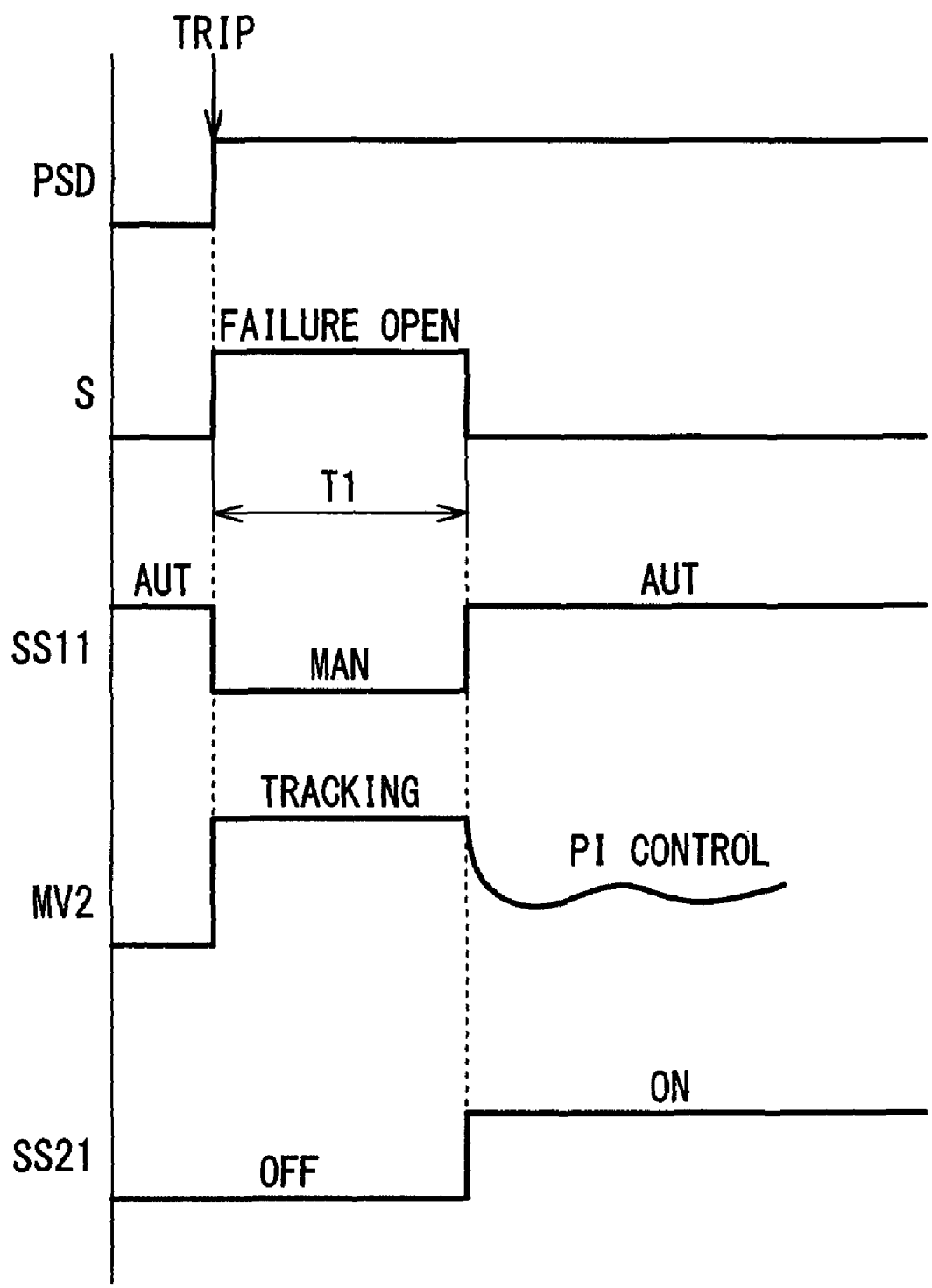
FIG. 3 is a timing chart explaining a turbine bypass control method according to the first embodiment.
Figure 4:
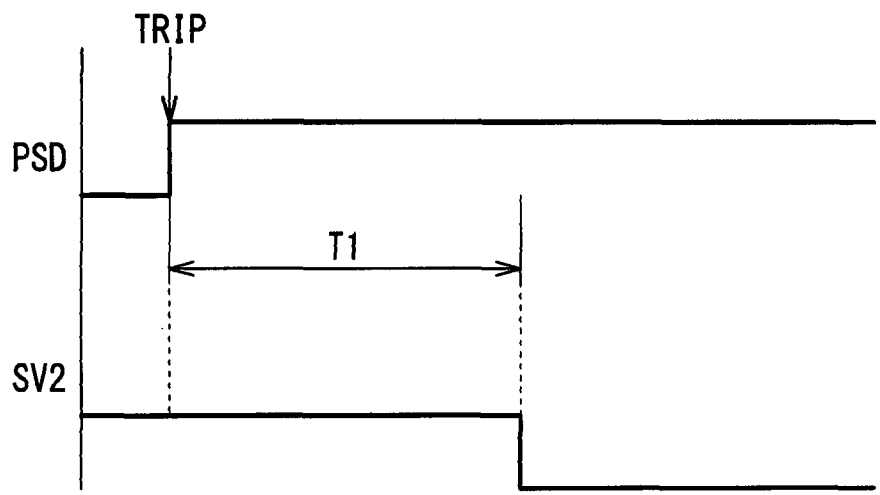
FIG. 4 is another timing chart explaining the turbine bypass control method according to the first embodiment.
Figure 5:
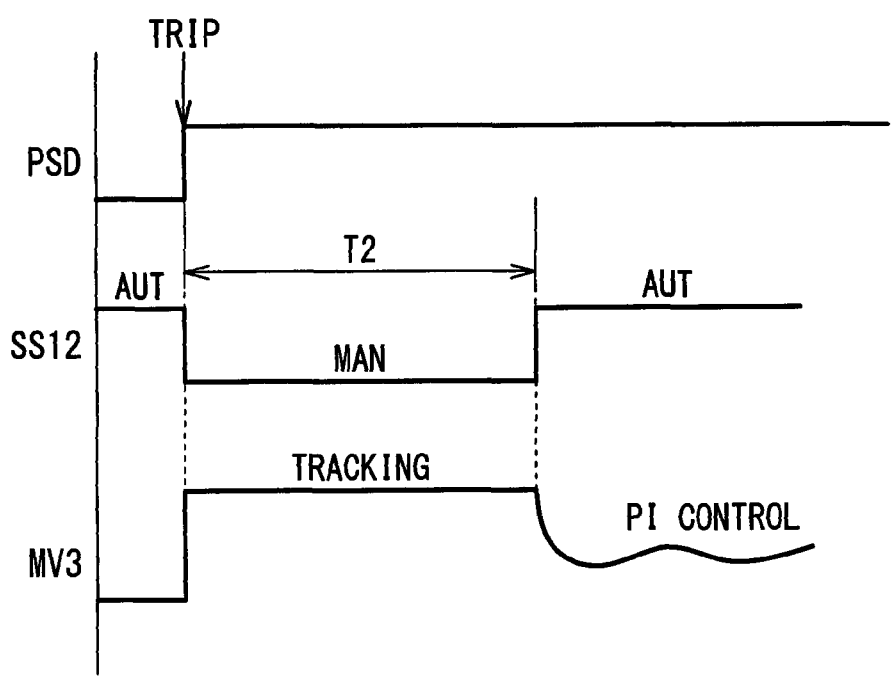
FIG. 5 is another timing chart explaining the turbine bypass control method according to the first embodiment.

Referring to FIGS. 3 to 5, a turbine bypass control method according to the first embodiment will be described.

(Control of Turbine Bypass Valve 10 Before Start of Trip)

Referring to FIG. 3, a control of the turbine bypass valve 10 before start of a trip of the turbine 13 will be described. Before start of the trip, the turbine 13 is driven by the steam flowing from the high-pressure side header 11 to the low-pressure side header 12 through the turbine 13. Before a trip signal PSD indicates the start of the trip of the turbine 13 (before start of the trip), the signal output unit 40 outputs the solenoid signal S that does not indicate quick opening, the automatic-manual switching signal SS11 indicating an automatic control mode (PI control mode) and the pressure control switching signal SS21 indicating an OFF state. Since the automatic-manual switching signal SS11 indicating the automatic control mode is supplied to the pressure controller 41, the pressure controller 41 generates the operation amount signal MV1 based on the pressure detection signal PV1 and the pressure setting signal SV1 and outputs the operation amount signal MV1 to each of the high value selector 50 and the signal switching unit 52. Since the automatic-manual switching signal SS11 indicating the automatic control mode is supplied to the pressure controller 42, the pressure controller 42 generates the operation amount signal MV2 based on the pressure detection signal PV2 and the pressure setting signal SV2 and outputs the operation amount signal MV2 to each of the high value selector 50 and the signal switching unit 51. The high value selector 50 outputs as the operation amount signal MVH, one of the operation amount signals MV1 and MV2 which indicates the higher opening, to each of the signal switching units 51 and 52. Since the pressure control switching signal SS21 indicating the OFF state is supplied to the signal switching unit 51, the signal switching unit 51 outputs the operation amount signal MVH as the operation amount signal MV51. Since the pressure control switching signal SS21 indicating the OFF state is supplied to the signal switching unit 52, the signal switching unit 52 outputs the operation amount signal MVH as the operation amount signal MV52. The function generator 54 outputs the operation amount signal MV21 based on the operation amount signal MV51. The function generator 55 outputs the operation amount signal MV22 based on the operation amount signal MV52. Since the solenoid signal S that does not indicate quick opening is supplied to the first turbine bypass valve 21, the opening of the first turbine bypass valve 21 is controlled based on the operation amount signal MV21. The opening of the second turbine bypass valve 22 is controlled based on the operation amount signal MV22. As stated above, before start of the trip, the control unit 4 performs an override control (high value selection control) with respect to the steam pressure in the high-pressure side header 11 and that in the low-pressure side header 12.

(Control of Turbine Bypass Valve 10 after Start of Trip)

Referring to FIG. 3, a control of the turbine bypass valve 10 after start of the trip of the turbine 13 will be described. During a time period of T1 after the trip signal PSD indicates the start of the trip of the turbine 13, the signal output unit 40 outputs the solenoid signal S indicating quick opening, the automatic-manual switching signal SS11 indicating a manual control mode and the pressure control switching signal SS21 indicating the OFF state. Since the solenoid signal S indicating quick opening is supplied to the first turbine bypass valve 21, the first turbine bypass vale 21 is quickly opened. Since the automatic-manual switching signal SS11 indicating the manual control mode is supplied to the pressure controller 41, the pressure controller 41 tracks the operation amount signal MV1 based on the valve opening signal V2 (the opening of the second turbine bypass valve) and outputs the operation amount signal MV1 to each of the high value selector 50 and the signal switching unit 52. Since the automatic-manual switching signal SS11 indicating the manual control mode is supplied to the pressure controller 42, the pressure controller 42 tracks the operation amount signal MV2 based on the valve opening signal V1 (the opening of the first turbine bypass valve) and outputs the operation amount signal MV2 to each of the high value selector 50 and the signal switching unit 51. Since the first turbine bypass valve 21 is in a quick opening state, the operation amount signal MV2 is tracked as shown in FIG. 3. The high value selector 50 outputs as the operation amount signal MVH, one of the operation amount signals MV1 and MV2 which indicates the higher opening, to each of the signal switching units 51 and 52. Since the pressure control switching signal SS21 indicating the OFF state is supplied to the signal switching unit 51, the signal switching unit 51 outputs the operation amount signal MVH as the operation amount signal MV51. Since the pressure control switching signal SS21 indicating the OFF state is supplied to the signal switching unit 52, the signal switching unit 52 outputs the operation amount signal MVH as the operation amount signal MV52. The function generator 54 outputs the operation amount signal MV21 based on the operation amount signal MV51. The function generator 55 outputs the operation amount signal MV22 based on the operation amount signal MV52. The opening of the second turbine bypass valve 22 is controlled based on the operation amount signal MV22.

The T1 time is determined from volumes of the high-pressure side header 11 and the low-pressure side header 12, operation speeds of the first turbine bypass valve 21 and the second turbine bypass valve 22 and such characteristics as rangeability so that the steam pressure in the high-pressure side header 11 does not excessively fall.

After passage of the T1 time since the trip signal PSD indicates the start of the trip of the turbine 13, the signal output unit 40 outputs the solenoid signal S that does not indicate quick opening, the automatic-manual switching signal SS11 indicating the automatic control mode (PI control mode) and the pressure control switching signal SS21 indicating an ON state. Since the automatic-manual switching signal SS11 indicating the automatic control mode is supplied to the pressure controller 41, the pressure controller 41 generates the operation amount signal MV1 based on the pressure detection signal PV1 and the pressure setting signal SV1 and outputs the operation amount signal MV1 to each of the high value selector 50 and the signal switching unit 52. Since the automatic-manual switching signal SS11 indicating the automatic control mode is supplied to the pressure controller 42, the pressure controller 42 generates the operation amount signal MV2 based on the pressure detection signal PV2 and the pressure setting signal SV2 and outputs the operation amount signal MV2 to each of the high value selector 50 and the signal switching unit 51. The high value selector 50 outputs as the operation amount signal MVH, one of the operation amount signals MV1 and MV2 which indicates the higher opening, to each of the signal switching units 51 and 52. Since the pressure control switching signal SS21 indicating the ON state is supplied to the signal switching unit 51, the signal switching unit 51 outputs the operation amount signal MV2 as the operation amount signal MV51. Since the pressure control switching signal SS21 indicating the ON state is supplied to the signal switching unit 52, the signal switching unit 52 outputs the operation amount signal MV1 as the operation amount signal MV52. The function generator 54 outputs the operation amount signal MV21 based on the operation amount signal MV51. The function generator 55 outputs the operation amount signal MV22 based on the operation amount signal MV52. The opening of the first turbine bypass valve 21 is controlled based on the operation amount signal MV21. Namely, the opening of the first turbine bypass valve 21 is controlled based on the steam pressure in the low-pressure side header 12. The opening of the second turbine bypass valve 22 is controlled based on the operation amount signal MV22. Namely, the opening of the second turbine bypass valve 22 is controlled based on the steam pressure in the high-pressure side header 11. As stated above, after passage of the T1 time since the start of the trip, the control unit 4 performs individual pressure controls to the steam pressure in the high-pressure side header 11 and that in the low-pressure side header 12.

It is important to perform the individual pressure controls after the first turbine bypass valve 21 is manually controlled to quickly open for the T1 time, in order to appropriately control both the steam pressure in the high-pressure side header 11 and that in the low-pressure side header 12. Furthermore, by tracking the operation amount signals MV1 and MV2, switching from the manual control mode to the automatic control mode can be smoothly carried out.

According to the present embodiment, it is possible to suppress a rapid increase in the steam pressure in the high-pressure side header 11 and in the low-pressure side header 12 without using a turbine flow amount as the flow amount of the steam flowing through the turbine 13 and without reducing the steam pressure in the high-pressure side header 11. According to the present embodiment, it is possible to omit a turbine flow meter measuring the turbine flow amount. Since there is no need to consider possible damage and maintenance of the turbine flow meter, the steam system 1 has a higher reliability than that of a system requiring a turbine flow meter.

In the present embodiment, the set pressure P2 in the automatic control mode after the start of the trip is set lower than the set pressure P2 in the automatic control mode before the start of the trip, thereby further improving control. For example, as shown in FIG. 4, the signal output unit 40 outputs the pressure setting signal SV2 indicating the set pressure P2 of 26 K/G to the pressure controller 42 before passage of the T1 time since the trip signal PSD indicates the start of the trip of the turbine 13. Further, the signal output unit 40 outputs the pressure setting signal SV2 indicating the set pressure P2 of 25 K/G to the pressure controller 42 after passage of the T1 time since the trip signal PSD indicates the start of the trip of the turbine 13. By reducing the set pressure P2, it is difficult to reduce the steam pressure in the high-pressure side header 11. Moreover, a difference between the set pressures P2 and P3 is made greater and a difference between the set pressures P2 and P7 is made greater. Accordingly, it is possible to prevent a control of the first turbine bypass valve 21 by the pressure controller 42 from interfering with a control of the blow-off valve 20 by the pressure controller 43 and a control of the low-pressure side outflow control valve 27 by the pressure controller 47.

In the present embodiment, by adding a control of the blow-off valve 20 to be described later, it is possible to ensure suppressing a rapid increase in the steam pressure in the low-pressure side header 12 following the quick opening of the first turbine bypass valve 21.

(Control of Blow-off Valve 20 Before Start of Trip)

Referring to FIG. 5, the control of the blow-off valve 20 before the start of the trip of the turbine 13 will be described. Before the trip signal PSD indicates the start of the trip of the turbine 13 (before start of the trip), the signal output unit 40 outputs the automatic-manual switching signal SS12 indicating the automatic control mode (PI control mode). Since the automatic-manual switching signal SS12 indicating the automatic control mode is supplied to the pressure controller 43, the pressure controller 43 generates the operation amount signal MV3 based on the pressure detection signal PV3 and the pressure setting signal SV3 and outputs the operation amount signal MV3 to the blow-off valve 20. As already stated, the pressure controller 43 performs a PI control to the steam pressure in the low-pressure side header 12.

(Control of Blow-off Valve 20 After Start of Trip)

Referring to FIG. 5, the control of the blow-off valve 20 after the start of the trip of the turbine 13 will be described. During a period of T2 time after the trip signal PSD indicates the start of the trip of the turbine 13, the signal output unit 40 outputs the automatic-manual switching signal SS12 indicating the manual control mode. Since the automatic-manual switching signal SS12 indicating the manual control mode is supplied to the pressure controller 43, the pressure controller 43 tracks the operation amount signal MV3 based on the valve opening signal V3 and outputs the operation amount signal MV3 to the blow-off valve 20. Since the valve opening signal V3 indicates a fixed value of the opening, the operation amount signal MV3 is tracked as shown in FIG. 5.

The T2 time is determined in consideration of differences in characteristics (such as operation time delay and rangeability) between the turbine bypass valve 10 and the blow-off valve 20 such that the rapid increase in the steam pressure in the low-pressure side header 12 due to the quick opening of the first turbine bypass valve 21 can be suppressed. A case that the T2 time is shorter than the T1 time, a case that the T2 time is equal to the T1 time and a case that the T2 time is longer than the T1 time are possibly present.

After passage of the T2 time since the trip signal PSD indicates the start of the trip of the turbine 13, the signal output unit 40 outputs the automatic-manual switching signal SS12 indicating the automatic control mode (PI control mode). Since the automatic-manual switching signal SS12 indicating the automatic control mode is supplied to the pressure controller 43, the pressure controller 43 generates the operation amount signal MV3 based on the pressure detection signal PV3 and the pressure setting signal SV3 and outputs the operation amount signal MV3 to the blow-off valve 20. As stated above, the pressure controller 43 performs a PI control to the steam pressure in the low-pressure side header 12.

Figure 6:
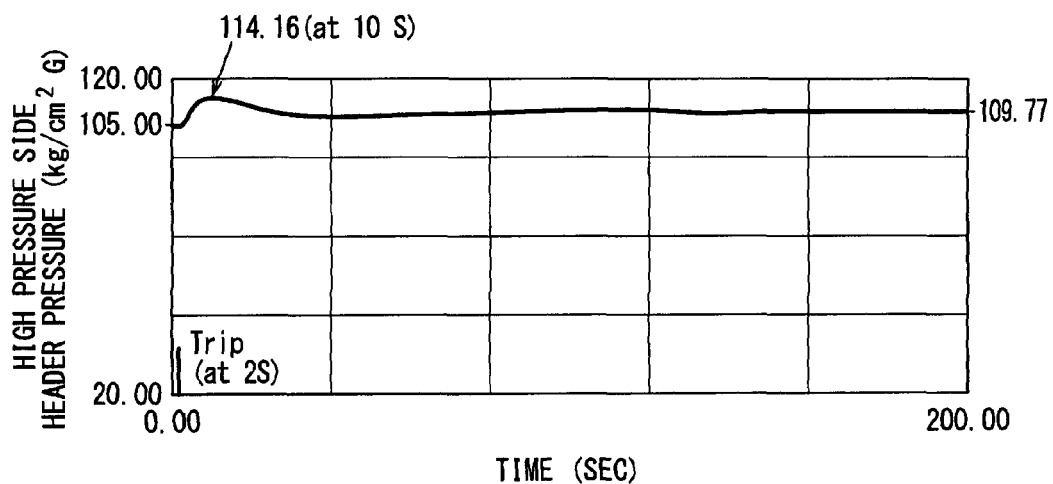
FIG. 6 is a graph showing a change in a pressure in a high-pressure side header in relation to the turbine bypass control method according to the first embodiment.
Figure 7:
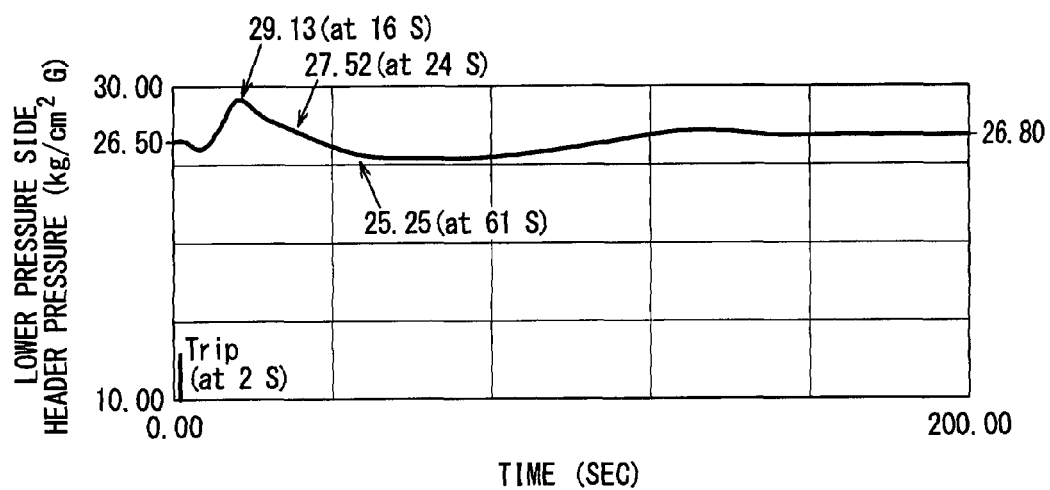
FIG. 7 is a graph showing a change in a pressure in a low-pressure side header in relation to the turbine bypass control method according to the first embodiment.

Referring to FIGS. 6 and 7, a result of a simulation when a turbine bypass control according to the present embodiment is performed will be described. In the simulation, both the T1 time and the T2 time are 1-second period and the fixed value of an opening indicated by the valve opening signal V3 is 35%.

FIG. 6 shows a change in the steam pressure in the high-pressure side header 11. The trip started at 2 seconds from the start. The steam pressure in the high-pressure side header 11 increased from the initial value of 105 K/G after the start of the trip and reached 114.16 K/G at ten seconds time from the start of the trip. Thereafter, the steam pressure in the high-pressure side header 11 fell and became stable at around 110 K/G.

FIG. 7 shows a change in the steam pressure in the low-pressure side header 12. The steam pressure in the low-pressure side header 12 increased from the initial value of 26.5 K/G after start of the trip and reached 29.13 K/G at 16 seconds from the start of the trip. Thereafter, the steam pressure in the low-pressure side header 12 fell and became stable in a range from 25 K/G to 27 K/G. Since the steam pressure in the low-pressure side header 12 did not reach the operation pressure P5, the safety valve 25 did not operate.

Figure 8:
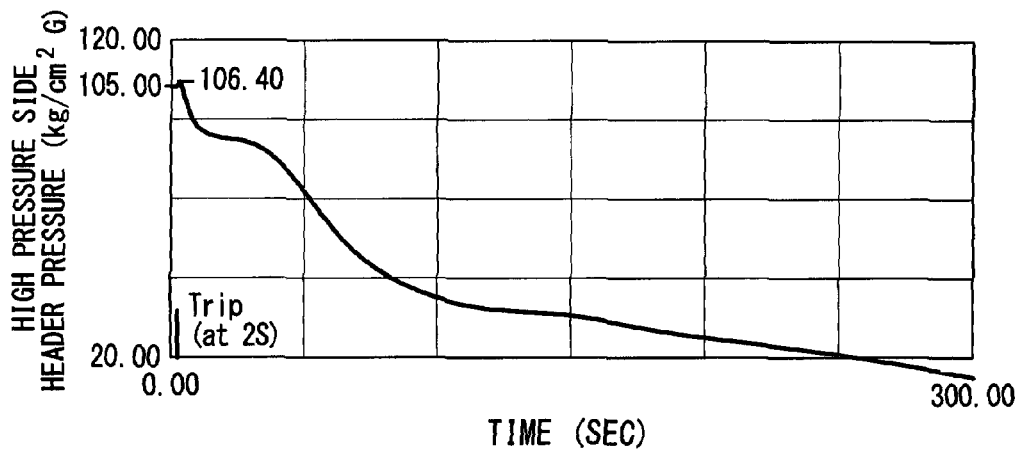
FIG. 8 is a graph showing a change in a pressure in a high-pressure side header in relation to a turbine bypass control method according to a comparison example.
Figure 9:
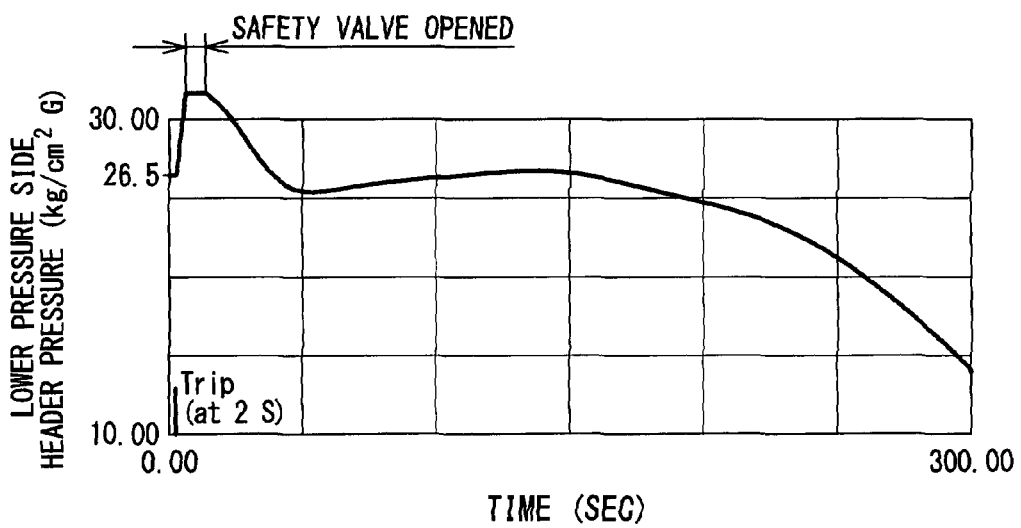
FIG. 9 is a graph showing a change in a pressure in a low-pressure side header in relation to the turbine bypass control method according to the comparison example.

Referring to FIGS. 8 and 9, a result of a simulation in which a turbine bypass control different from the turbine bypass control according to the present embodiment is performed will be described. In this control, the first turbine bypass valve 21, the second turbine bypass valve 22 and the blow-off valve 20 are quickly opened for one second after start of the trip, and then the PI control is restarted. In the restarted PI control, the control unit 4 performs an override control to the first turbine bypass valve 21 and the second turbine bypass valve 22.

FIG. 8 shows a change in the steam pressure in the high-pressure side header 11. The trip started at two seconds from the start. The steam pressure in the high-pressure side header 11 increased from the initial value of 105 K/G to 106.4 K/G and then decreased and finally became lower than 20 K/G.

FIG. 9 shows a change in the steam pressure in the low-pressure side header 12. The steam pressure in the low-pressure side header 12 increased from the initial value of 26.5 K/G to the operation pressure P5, and the safety valve 25 operated. The steam pressure in the low-pressure side header 12 finally became lower than 15 K/G.

It is sufficient that the operation pressure P5 and the set pressures P1 to P3 and P5 to P7 satisfy a relationship expressed by the following inequality and are not limited to the numerical values stated above:

$$P2<P7<P3<P5<P6<P1$$

The steam system 1 and the turbine bypass control method according to the present embodiment may be appropriately changed. For example, during the period of the T1 time since start of the trip, not only the first turbine bypass valve 21 but also the second turbine bypass valve 22 may be quickly opened.

As stated above, the first turbine bypass valve 21 and the second turbine bypass valve 22 preferably have the parent valve-to-child valve relationship therebetween. However, if the steam system 1 is small in size, it is not always necessary to maintain the parent valve-to-child valve relationship between the first turbine bypass valve 21 and the second turbine bypass valve 22.

What is claimed is:

1. A turbine bypass control apparatus for a turbine connected between a high-pressure side header and a low-pressure side header and driven by steam which flows from said high-pressure side header to said low-pressure side header, comprising:
    first and second bypass valves connected between said high-pressure side header and said low-pressure side header in parallel to said turbine; and
    a control unit configured to:
    control openings of said first and second bypass valves based on a higher operation amount signal as one of first and second operation amount signals, which indicates a higher operation amount, in an automatic mode before start of a trip of said turbine; and
    control said first bypass valve to be rapidly opened, track the first operation amount signal based on a second opening signal, and track the second operation amount signal based on a first opening signal, in a manual mode during a first time period from the start of the trip of said turbine,
    wherein said first and second bypass valves are manually controlled in the manual mode, and
    wherein in the automatic mode, said control unit generates the first operation amount signal based on a first pressure setting signal indicating a setting steam pressure of said high-pressure side header, a first detection signal indicating a steam pressure of said high-pressure side header, and the second opening signal indicating the opening of said second bypass valve, and generates the second operation amount signal based on a second pressure setting signal indicating a setting steam pressure of said low-pressure side header, a second detection signal of a steam pressure of said low-pressure side header, and the first opening signal indicating the opening of said first bypass valve.

2. The turbine bypass control apparatus according to claim 1, wherein said control unit is further configured to control the opening of said first bypass valve based on the second operation amount signal and the opening of the second bypass valve based on the first operation amount signal, in the automatic mode after the first time period from the start of the trip of said turbine.

3. The turbine bypass control apparatus according to claim 2, wherein said control unit comprises:
    a first operation amount control unit configured to generate the first operation amount signal based on the first pressure setting signal, the first detection signal, and the second opening signal in the automatic mode, and track the first operation amount signal based on the second opening signal, in the manual mode;
    a second operation amount control unit configured to generate the second operation amount signal based on the second pressure setting signal, the second detection signal, and the first opening signal in the automatic mode, and track the second operation amount signal based on the first opening signal, in the manual mode;
    a higher operation amount selector configured to select as the higher operation amount signal, one of the first operation amount signal and the second operation amount signal which indicates the higher operation amount;
    a rapid opening control unit configured to automatically control said first bypass valve to be rapidly opened in the manual mode;
    a first valve opening control unit configured to receive the higher operation amount signal and the second operation amount signal, and control the opening of said first bypass valve to an opening value which is determined based on the higher operation amount signal in the automatic mode before the start of the trip; and control the opening of said first bypass valve based on the second operation amount signal in the automatic mode after the first time period from the start of the trip of said turbine; and
    a second valve opening control unit configured to receive the higher operation amount signal and the first operation amount signal, and control the opening of said second bypass valve to an opening value which is determined based on the higher operation amount signal in the automatic mode before the start of the trip; and control the opening of said second bypass valve based on the first operation amount signal in the automatic mode after the first time period from the start of the trip of said turbine.

4. The turbine bypass control apparatus according to claim 3, wherein said first valve opening control unit comprises:
    a first function generator configured to output a first opening control signal such that a first output opening indicated by the first opening control signal is proportional to a first input opening indicated by the higher operation amount signal or the second operation amount signal when the first input opening is in a range of 0 to 50%, and the first output opening is 100% when the first input opening is in a range of 50 to 100%, in the automatic mode,
    said second valve opening control unit comprises:
    a second function generator configured to output a second opening control signal such that a second output opening indicated by the second opening control signal is 0% when a second input opening is in a range of 0 to 50%, and the second output opening is proportional to the second input opening indicated by the higher operation amount signal or the first operation amount signal when the second input opening is in a range of 540 to 100%, in the automatic mode,
    said first bypass valve is controlled in response to the first opening control signal, and said second bypass valve is controlled in response to the second opening control signal.

5. The turbine bypass control apparatus according to claim 2, wherein the setting steam pressure indicated by the second pressure setting signal in the automatic mode after the first time period is lower than the setting steam pressure indicated by the second pressure setting signal in the automatic mode before the start of the trip.

6. The turbine bypass control apparatus according to claim 2, further comprising:
a blow-off valve connected to said low-pressure side header; and
a blow-off valve pressure controller configured to generate a third operation amount signal based on a third pressure setting signal indicating a setting steam pressure of said lower-pressure side header, a third detection signal indicating the steam pressure of said low-pressure side header, and a third opening signal indicating an opening of said blow-off valve, to control said blow-off valve to an opening based on the third operation amount signal in the automatic mode, and track the third operation amount signal based on a predetermined value in the manual mode.

7. The turbine bypass control apparatus according to claim 2, wherein said first bypass valve is a child valve and said second bypass valve is a parent valve.

8. The turbine bypass control apparatus according to claim 2, wherein a maximum flow amount of said second bypass valve is larger than that of said first bypass valve.

9. A turbine bypass control method for a turbine connected between a high-pressure side header and a low-pressure side header and driven by steam which flows from said high-pressure side header to said low-pressure side header, wherein first and second bypass valves are connected between said high-pressure side header and said low-pressure side header in parallel to said turbine, comprising:
generating a first operation amount signal based on a first pressure setting signal indicating a setting steam pressure of said high-pressure side header, a first detection signal indicating a steam pressure of said high-pressure side header, and a second opening signal indicating an opening of said second bypass valve in an automatic mode before start of a trip of said turbine;
generating a second operation amount signal based on a second pressure setting signal indicating a setting steam pressure of said low-pressure side header, a second detection signal of a steam pressure of said low-pressure side header, and a first opening signal indicating an opening of said first bypass valve in the automatic mode;
controlling openings of said first and second bypass valves based on a higher operation amount signal as one of the first and second operation amount signals, which indicates a higher operation amount, in the automatic mode;
controlling said first bypass valve to be rapidly opened in a manual mode during a first time period form the start of the trip of said turbine, wherein said first and second bypass valves are manually controlled in the manual mode;
tracking the first operation amount signal based on a second opening signal, and the second operation amount signal based on a first opening signal, in the manual mode.

10. The turbine bypass control method according to claim 9, further comprising:
controlling the opening of said first bypass valve based on the second operation amount signal and the opening of the second bypass valve based on the first operation amount signal, in the automatic mode after the first time period from the start of the trip of said turbine.

11. The turbine bypass control method according to claim 10, wherein said controlling openings of said first and second bypass valves in the automatic mode comprises:
generating the higher operation amount signal from the first operation amount signal and the second operation amount signal in the automatic mode before the start of the trip; and
controlling the openings of said first and second bypass valves based on the higher operation amount signal in the automatic mode before the start of the trip.

12. The turbine bypass control method according to claim 10, wherein each of said controlling openings of said first and second bypass valves based on a higher operation amount signal and said controlling the opening of said first bypass valve based on the second operation amount signal and the opening of the second bypass valve based on the first operation amount signal comprises:
generating a first opening control signal such that a first output opening indicated by the first opening control signal is proportional to a first input opening indicated by the higher operation amount signal or the second operation amount signal when the first input opening is in a range of 0 to 50%, and the first output opening is 100% when the first input opening is in a range of 50 to 100%, in the automatic mode;
generating a second opening control signal such that a second output opening indicated by the second opening control signal is 0% when a second input opening is in a range of 0 to 50%, and the second output opening is proportional to the second input opening indicated by the higher operation amount signal or the first operation amount signal when the second input opening is in a range of 540 to 100%, in the automatic mode; and
controlling said first bypass valve in response to the first opening control signal, and said second bypass valve in response to the second opening control signal in the automatic mode.

13. The turbine bypass control method according to claim 10, wherein the setting steam pressure indicated by the second pressure setting signal in the automatic mode after the first time period is lower than the setting steam pressure indicated by the second pressure setting signal in the automatic mode before the start of the trip.

14. The turbine bypass control method according to claim 10, further comprising:
generating a third operation amount signal based on a third pressure setting signal indicating a setting steam pressure of said lower-pressure side header, a third detection signal indicating the steam pressure of said low-pressure side header, and a third opening signal indicating an opening of said blow-off valve in the automatic mode before the start of the trip and after a second time period from the start of the trip, wherein a blow-off valve is connected to said low-pressure side header in the automatic mode;
controlling said blow-off valve to an opening based on the third operation amount signal in the automatic mode; and
tracking the third operation amount signal based on a predetermined value in the manual mode.

15. The turbine bypass control method according to claim 10, wherein said first bypass valve is a child valve and said second bypass valve is a parent valve.

16. The turbine bypass control method according to claim 10, wherein a maximum flow amount of said second bypass valve is larger than that of said first bypass valve.

* * * * *